US010671519B2

(12) United States Patent
Jayaswal (10) Patent No.: US 10,671,519 B2
(45) Date of Patent: Jun. 2, 2020

(54) UNIT TESTING FOR CHANGES TO VERSION CONTROL

(71) Applicant: Microsoft Technology Licensing, LLC, Redmond, WA (US)

(72) Inventor: Manish Kumar Jayaswal, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/965,714

(22) Filed: Apr. 27, 2018

(65) Prior Publication Data

US 2019/0332524 A1    Oct. 31, 2019

(51) Int. Cl.
*G06F 11/36* (2006.01)
*G06F 8/33* (2018.01)
*G06F 8/71* (2018.01)

(52) U.S. Cl.
CPC ............ *G06F 11/3688* (2013.01); *G06F 8/33* (2013.01); *G06F 8/71* (2013.01); *G06F 11/3664* (2013.01); *G06F 11/3676* (2013.01)

(58) Field of Classification Search
CPC . G06F 8/71; G06F 11/33; G06F 11/36; G06F 11/3604; G06F 11/362; G06F 11/3624; G06F 11/3664; G06F 11/3672; G06F 11/3676; G06F 11/3688; G06F 11/3692; G06F 11/3696
USPC .................................................. 717/124–135
See application file for complete search history.

(56) References Cited

U.S. PATENT DOCUMENTS

| | | | | |
|---|---|---|---|---|
| 5,907,705 A | * | 5/1999 | Carter | G06Q 10/06 717/122 |
| 6,493,868 B1 | * | 12/2002 | DaSilva | G06F 8/20 345/1.3 |
| 6,993,710 B1 | * | 1/2006 | Coad | G06F 8/71 715/202 |
| 7,392,507 B2 | * | 6/2008 | Kolawa | G06F 11/3624 714/E11.209 |

(Continued)

FOREIGN PATENT DOCUMENTS

| | | |
|---|---|---|
| WO | 2008082610 A2 | 7/2008 |
| WO | 2016167760 A1 | 10/2016 |

OTHER PUBLICATIONS

Anonymous, "Real-time Profiling using the Cloud," IP.com, Sep. 25, 2015, last retrieved from https://ip.com/IPCOM000243502 on Jan. 3, 2019. (Year: 2015).*

(Continued)

*Primary Examiner* — Andrew M. Lyons
(74) *Attorney, Agent, or Firm* — Alleman Hall Creasman & Tuttle LLP (57) ABSTRACT

A computer device is provided that includes a display and a processor configured to execute an integrated development environment that includes a unit testing system configured to manage a plurality of unit tests for a set of code files. The processor is further configured to determine that a user is preparing to make a change to version control for the set of code files, retrieve test result data for one or more unit tests covering one or more code files of the set of code files that have been changed in the change to version control, and output the test result data on the display before completing the change to version control for the set of code files.

18 Claims, 5 Drawing Sheets

(56) References Cited

U.S. PATENT DOCUMENTS

| | | | |
|---|---|---|---|
| 7,506,312 B1* | 3/2009 | Girolami-Rose | G06F 8/71 717/101 |
| 7,877,738 B2* | 1/2011 | Goldstein | G06F 8/48 717/140 |
| 8,539,282 B1* | 9/2013 | Kabanov | G06F 11/3688 702/182 |
| 8,762,950 B2* | 6/2014 | Beasley | G06F 11/3604 717/124 |
| 9,015,671 B2* | 4/2015 | Johnson | G06F 11/3688 717/111 |
| 9,189,208 B2* | 11/2015 | Hammontree | G06F 8/33 |
| 9,262,132 B1* | 2/2016 | Lugton | G06F 8/36 |
| 9,280,442 B1 | 3/2016 | Nicolo | |
| 9,395,979 B1* | 7/2016 | Bullukian | G06F 8/71 |
| 9,411,709 B2* | 8/2016 | Bates | G06F 11/3636 |
| 9,430,229 B1* | 8/2016 | Van Zijst | G06F 9/3844 |
| 9,645,915 B2* | 5/2017 | Bienkowski | G06F 11/3664 |
| 2003/0212661 A1* | 11/2003 | Avvari | G06F 11/3676 |
| 2004/0221270 A1* | 11/2004 | Witchel | G06F 8/71 717/124 |
| 2005/0166094 A1* | 7/2005 | Blackwell | G06F 11/3664 714/38.14 |
| 2005/0223357 A1* | 10/2005 | Banerjee | G06F 11/3676 717/120 |
| 2009/0070738 A1* | 3/2009 | Johnson | G06F 11/3688 717/106 |
| 2009/0172636 A1* | 7/2009 | Griffith | G06F 8/20 717/113 |
| 2010/0058294 A1* | 3/2010 | Best | G06F 8/71 717/122 |
| 2011/0197176 A1 | 8/2011 | Muharsky et al. | |
| 2011/0296386 A1* | 12/2011 | Woollen | G06F 8/70 717/124 |
| 2012/0042210 A1* | 2/2012 | Glaser | G06F 11/3684 714/38.1 |
| 2012/0089964 A1* | 4/2012 | Sawano | G06F 11/3684 717/124 |
| 2012/0222014 A1 | 8/2012 | Peretz et al. | |
| 2013/0024844 A1* | 1/2013 | Bienkowski | G06F 11/3688 717/125 |
| 2013/0152047 A1* | 6/2013 | Moorthi | G06F 11/368 717/124 |
| 2013/0167120 A1* | 6/2013 | Amano | G06F 8/71 717/122 |
| 2014/0013307 A1* | 1/2014 | Hansson | G06F 11/3692 717/124 |
| 2014/0123110 A1* | 5/2014 | Wan | G06F 11/3672 717/124 |
| 2014/0157262 A1* | 6/2014 | Hicks | G06F 9/45537 718/1 |
| 2014/0282400 A1* | 9/2014 | Moorthi | G06F 8/71 717/122 |
| 2015/0095619 A1* | 4/2015 | Dubey | G06F 11/3688 712/216 |
| 2015/0095884 A1 | 4/2015 | Marum et al. | |
| 2015/0135158 A1* | 5/2015 | Tenev | G06F 11/3684 717/101 |
| 2015/0161026 A1 | 6/2015 | Chan et al. | |
| 2015/0186253 A1* | 7/2015 | Abraham | G06F 11/3688 717/124 |
| 2015/0347094 A1* | 12/2015 | Lattner | G06F 8/30 717/109 |
| 2016/0085663 A1* | 3/2016 | Best | G06F 11/3692 714/38.1 |
| 2016/0147633 A1* | 5/2016 | Yoshida | G06F 11/368 717/124 |
| 2017/0169370 A1* | 6/2017 | Cornilescu | G06F 8/71 |
| 2017/0357565 A1* | 12/2017 | Ledet | G06F 11/362 |
| 2018/0004508 A1* | 1/2018 | Suri | G06F 8/36 |
| 2018/0089066 A1* | 3/2018 | Barnett | G06F 11/3684 |
| 2018/0129497 A1* | 5/2018 | Biddle | G06F 11/3668 |
| 2018/0260193 A1* | 9/2018 | Polisky | G06F 8/70 |
| 2018/0260312 A1* | 9/2018 | Strachan | G06F 11/3688 |
| 2018/0293158 A1* | 10/2018 | Baughman | G06F 11/3692 |
| 2018/0349257 A1* | 12/2018 | Bhattacharjee | G06F 11/3688 |

OTHER PUBLICATIONS

B. Earwood, Jeong Yang and Young Lee, "Impact of static and dynamic visualization in improving object-oriented programming concepts," 2016 IEEE Frontiers in Education Conference (FIE), Erie, PA, USA, 2016, pp. 1-5. (Year: 2016).*

M. Linares-Vásquez, K. Hossen, H. Dang, H. Kagdi, M. Gethers and D. Poshyvanyk, "Triaging incoming change requests: Bug or commit history, or code authorship?," 2012 28th IEEE International Conference on Software Maintenance (ICSM), Trento, 2012, pp. 451-460. (Year: 2012).*

J. Liu, J. Li and L. He, "A Comparative Study of the Effects of Pull Request on GitHub Projects," 2016 IEEE 40th Annual Computer Software and Applications Conference (COMPSAC), Atlanta, GA, 2016, pp. 313-322. (Year: 2016).*

C. Vassallo et al., "Continuous Delivery Practices in a Large Financial Organization," 2016 IEEE International Conference on Software Maintenance and Evolution (ICSME), Raleigh, Nc, 2016, pp. 519-528. (Year: 2016).*

Y. Yu, H. Wang, V. Filkov, P. Devanbu and B. Vasilescu, "Wait for It: Determinants of Pull Request Evaluation Latency on GitHub," 2015 IEEE/ACM 12th Working Conference on Mining Software Repositories, Florence, 2015, pp. 367-371. (Year: 2015).*

F. A. Abdul and M. C. S. Fhang, "Implementing Continuous Integration towards rapid application development," 2012 International Conference on Innovation Management and Technology Research, Malacca, 2012, pp. 118-123. (Year: 2012).*

B. Adams and S. McIntosh, "Modern Release Engineering in a Nutshell—Why Researchers Should Care," 2016 IEEE 23rd International Conference on Software Analysis, Evolution, and Reengineering (SANER), Suita, 2016, pp. 78-90. (Year: 2016).*

"Technical debt", Retrieved From https://en.wikipedia.org/wiki/Technical_debt, Retrieved on: Mar. 18, 2018, 5 Pages.

"International Search Report and Written Opinion Issued in PCT Application No. PCT/US2019/028423", dated Apr. 15, 2020, 20 Pages.

* cited by examiner

UNIT TESTING FOR CHANGES TO VERSION CONTROL

BACKGROUND

Developing code that is easier to initially implement instead of spending more development time implementing a stable solution from the start may cause technical debt to accrue. Many enterprises struggle to manage and contain their technical debt with respect to testing for their code bases. Paying off the built-up technical debt becomes increasingly expensive and time consuming for these enterprises. However, in the long run, not paying off the technical debt can reduce the stability of the code base and potentially increase development time compared to paying off the technical debt earlier in the development cycle.

SUMMARY

A computer device is provided that includes a display and a processor configured to execute an integrated development environment that includes a unit testing system configured to manage a plurality of unit tests for a set of code files. The processor is further configured to determine that a user is preparing to make a change to version control for the set of code files, retrieve test result data for one or more unit tests covering one or more code files of the set of code files that have been changed in the change to version control, and output the test result data on the display before completing the change to version control for the set of code files.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
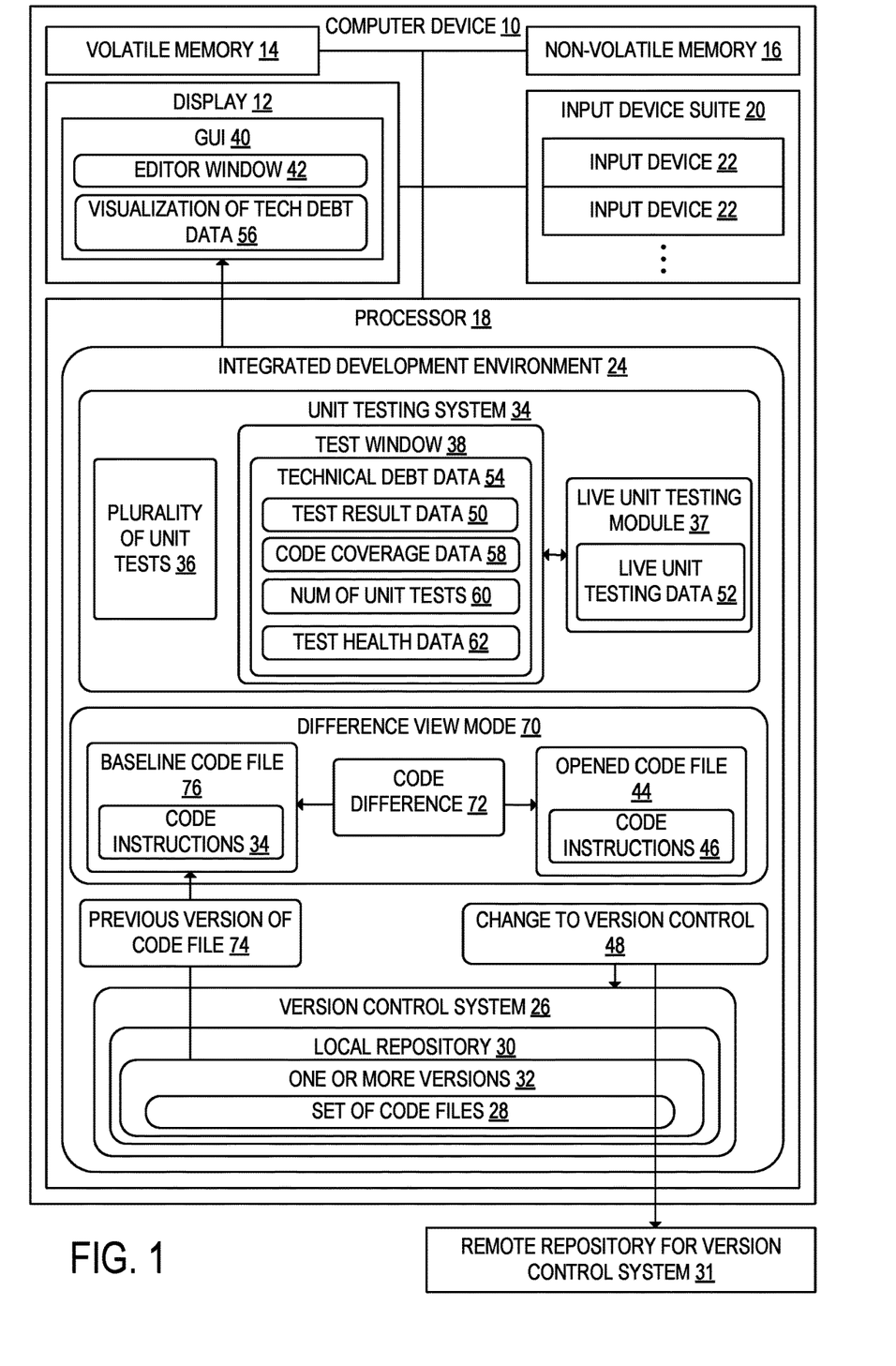
FIG. 1 shows an example computer device implementing an integrated development environment according to one embodiment of the present disclosure.

In order to address the challenges discussed above, a computer device 10 is provided, as shown in the example embodiment of FIG. 1. The computer device 10 may include a display 12, volatile memory 14, non-volatile memory 16, a processor 18, and/or an input device suite 20 including one or more input devices 22. The one or more input devices 22 may include, for example, one or more of a keyboard, a mouse, a trackpad, a touchscreen, a microphone, a camera, an inertial motion unit, a global positioning system (GPS) unit, and/or some other input device 22. In addition to the display 12, the computer device 10 may further include one or more other output devices, such as a speaker, a haptic feedback unit, or another type of output device.

The processor 18 of the computer device 10 may be configured to execute an integrated development environment (IDE) 24 that includes a source code editor for editing code files. The IDE 24 may further include a version control system 26 configured to manage a set of code files 28. The version control system 26 includes a local repository 30 that stores and organizes one or more versions 32 of the set of code files 28. The version control system 26 may be configured to control communication between the ID 24 executed by the processor 18 of the computer device 10 and a remote repository 31, which, for example, may be implemented by a server system. In one example, the version control system 26 may implement a git-based version control. However, it will be appreciated that the version control system 26 may implement any suitable type of version control.

The IDE 24 may further include a unit testing system 34 configured to manage a plurality of unit tests 36 for the set of code files 28. Each of the plurality of unit tests 36 is configured to perform one or more tests on a unit of source code of an associated code file of the set of code files 28. In one example, the plurality of unit tests 36 may be accessed by a user of the computer device 10 via a test window 38. Using the test window 38, the user may run one or more of the plurality of unit tests 36, and view the results of those unit tests.

In another example, the unit testing system 34 includes a live unit testing module 37 that is configured to perform live unit testing as the set of code files 28 are edited in real-time. For example, as the user edits and changes a particular code file, such as adding a new line of code, data for the edited code file may be sent to the live unit testing module 37 which may be configured to perform one or more of the plurality of unit tests 36 that are associated with the edited code file. These unit tests may be iteratively performed when the user makes edits to the code file, and the results of those iterative tests may be output to the test window 38.

As illustrated in FIG. 1, the processor 18 may be configured to output a graphical user interface (GUI) 40 of the IDE 24 to the display 12. The GUI 40 may include various GUI elements, such as, for example, a tool bar, windows, and other GUI elements that a user of the computer device 10 may utilize to enter input to the IDE 24 via the input device suite 20. In one example, the GUI 40 output to the display 12 includes an editor window 42 of the IDE 24 configured to present an opened code file 44 of the set of code files 28 to the user that was opened by the IDE 24 automatically and/or in response to user input. The editor window 42 may be configured to display code instructions 46 of the opened code file 44. The editor window 42 may also be configured to display GUI elements for organizing the displayed code instructions 46, such as, for example, line numbers. The editor window 42 may also display real-time mark-up of the opened code file 44 as the user edits/changes the code instructions 46, adds/deletes comments, or otherwise edits the opened code file 44. For example, the editor window 42 may indicate one or more syntax errors in the opened code file 44.

The user of the computer device 10 may continue to make changes/edits to the opened code file 44, and locally save those changes and edits. After changing/editing the opened code file 44, the user may initiate a change to version control 48 via the version control system 26. In a git-based version control system example, the change to version control 48 may take the form of a commit that includes one or more changes to one or more of the set of code files 28 stored on the local repository 30 of the version control system 26. The change to version control 48 may also take the form of a pull request that includes one or more commits to be applied to a master or origin version of the set of code files 28 stored on the remote repository 31 for the version control system 31. The remote repository 31 for the version control system may be configured to maintain the master or origin version of the set of code files 28 that may be pulled by a plurality of computer devices for a plurality of developers that are collaborating to develop the set of code files 28. The change to version control 48 in the form of the pull request may be sent to the remote repository 31, and an administrator of the remote repository 31 may review the change to version control 48 and decide whether to merge the change to version control 48 with the master or origin version of the set of code files 28. It will be appreciated that while git-based examples of changes to version control 48, such as commits and pull requests, are described herein, the described processes and methods are also applicable to other types of version control systems.

The IDE 24 executed by the processor 18 may be configured to determine that the user is preparing to make a change to version control 48 for the set of code files 28. For example, the user may begin preparing a pull request via a pull request tool of the IDE 24 or a pull request add-on installed for the IDE 24. The processor 18 may determine that the user is preparing to make the change to version control 48 when the user opens the pull request tool and selects one or more commits. As another example, the processor 18 may determine that the user is preparing to make the change to version control 48 when the user opens a commit tool and selects one or more edited code files to commit to the local repository's 30 version 32 of the set of code files 28.

Based on at least determining that the user is preparing to make the change to version control 48, the processor 18 may be further configured to retrieve test result data 50 for one or more unit tests covering one or more code files of the set of code files 28 that have been changed in the change to version control 48. The test result data 50 is retrieved from the unit testing system 34. In particular, the unit testing system 34 may be configured to store test result data 50 that is generated after running the plurality of unit tests 36 on the set of code files 28. In one example, the plurality of unit tests 36 may be manually selected by the user via the test window 38 to be run. In another example, the unit testing system 34 may include the live unit testing module 37 that is configured to run the plurality of unit tests 36 on the set of code files 28 in the background as the user changes/edits one or more of the set of code files 28. In this example, the live unit testing module 37 continually updates the test result data 50 as the user changes and edits one or more of the set of code files 28, and the retrieved test result data 50 is live unit testing data 52.

The IDE 24 executed by the processor 18 may be configured to output the test result data 50 on the display 12 before completing the change to version control 48 for the set of code files 28. That is, before the change to version control 48 is submitted and applied to the set of code files 28, the test result data 50 is presented to the user so that the user may review the results of the plurality of unit tests 36 associated with the changed code files in the change to version control 48 currently being prepared by the user.

In one example, the processor 18 may be configured to determine one or more changed code files of the set of code files 28 for the change to version control 48, and only show the test result data 50 for unit tests that are associated with those one or more changed code files. The processor 18 may be configured to filter out the test result data 50 for the other unit tests of the plurality of unit tests 36 that are not associated with those one or more changed code files. In this manner, the processor 18 may be configured to present the user with test result data 50 that is relevant to the changes included in the change to version control 48 being prepared.

The test result data 50 is one type of technical debt data 54 that may be gathered by the unit testing system 34 of the IDE 24. In one example, the unit testing system 34 executed by the processor 18 may be configured to determine other types of technical debt data 54 for the change to version control 48 for the set of code files 28. The technical debt data 54, which may include the test result data 50, may be retrieved from the unit testing system 34. The processor 18 may be configured to output a visualization of the technical debt data 56 on the display 12 before completing the change to version control 48 for the set of code files 28. That is, before the change to version control 48 is submitted and applied to the set of code files 28, the visualization of the technical debt data 56 is presented to the user so that the user may review the technical debt that potentially may be added to the set of code files 28 from the change to version control 48 currently being prepared by the user. By highlighting the technical debt being added by a given change to version control before that change is applied, the user can understand how much technical debt might be added and address the technical debt before it is applied to the set of code files 28.

In one example, the technical debt data 54 may include code coverage data 58 for the plurality of unit tests 36 that cover the one or more code files of the set of code files 28 that have been changed in the change to version control 48. In addition to being associated with particular code files of the set of code files 28, each of the plurality of unit tests 36 may also be associated with a particular unit of source code or particular lines of code instructions 46 of one or more of the set of code files 28. In one example, the live unit testing module 37 may be configured to instrument each of the set of code files 28, and associate the units of source code or lines of code instructions 46 of each of the set of code files 28 with one or more of the plurality of unit tests 36. As the live unit testing module 37 continually performs the plurality of unit tests 36 in the background while the user changes and edits one or more of the set of code files 28, the live unit testing module 37 may additionally track which units of source code of lines of code instructions 46 of each of the set of code files 28 is covered by the plurality of unit tests 36. For example, if the user adds a new code instruction to the opened code file 44, and does not associate that new code instruction with one or more of the plurality of unit tests 36, then the live unit testing module 37 may be configured to generate code coverage data 58 indicating that the new code instruction is not covered by the plurality of unit tests 36. As another example, the live unit testing module 37 may be configured to generate code coverage data 58 indicating how many unit tests of the plurality of unit tests 36 cover each code instruction 46 for each code file of the set of code files 28.

The code coverage data 58 may be generated by the live unit testing module 37 as discussed above, and stored as part of the technical debt data 54 stored by the unit testing system 34 of the IDE 24. Based on detecting that the user is preparing to make the change to version control 48 for the set of code files 28, the processor 18 may be configured to retrieve code coverage data for the one or more unit tests covering the changed code files of the change to version control 48. The processor 18 may be further configured to output the code coverage data 58 on the display 12 before completing the change to version control 48 for the set of code files 28. In one example, the code coverage data 58 may be represented in the visualization of technical debt data 56 shown via the GUI 40 of the IDE 24 output to the display 12.

In one example, the technical debt data 54 may include a total number of unit tests 60 of the plurality of unit tests 36 that cover the one or more code files of the set of code files 28 that have been changed in the change to version control 48. As discussed previously, each of the plurality of unit tests 36 may be associated with one or more of the set of code files 28. Thus, the technical debt data 54 may keep track of the total number of unit tests 60 that cover each of the set of code files 28. For each code file that was changed in the change to version control 48, the corresponding total number of unit tests 60 covering that code file may be retrieved from the unit testing system 34 and presented to the user via the visualization of technical debt data 56. In one example, the visualization of technical debt data 56 may include indications for different thresholds of the total number of unit tests 60. For example, code files that have a total number of unit tests 60 less than a first threshold may be given a danger indication that conveys to the user that additional unit tests need to be applied to the code file. As another example, code files that have a total number of unit tests 60 greater than a second threshold may be given a greenlight indication that conveys to the user that the code file is strongly covered by the plurality of unit tests 36.

In one example, the technical debt data 54 includes unit testing health data 62 for the plurality of unit tests 36 that cover the one or more code files of the set of code files 28 that have been changed in the change to version control 48. The unit testing health data 62 summarizes a state of the test result data 50 for each of the one or more code files that have been changed. For example, if no or too few unit tests have been associated with a code file, the unit testing health data 62 may indicate that the test result data 50 for the code file is in an unhealthy state. If unit tests have been associated with the code file but have not been run, the unit testing health data 62 may indicate that the test result data 50 for the code file is in an unhealthy state. If the unit tests have been run but have failed, the unit testing health data 62 may similarly indicate that the test result data 50 for the code file is in an unhealthy state. On the other hand, if the unit tests have been run and a suitable number have passed, the unit testing health data 62 may indicate that the test result data 50 for the code file is in a healthy state. In these examples, the processor 18 may be configured to retrieve the unit testing health data 62 from the unit testing system 34, and present the unit testing health data 62 via the visualization of technical debt data 56. For example, changed code files of the change to version control 48 having unit test health data 62 indicating an unhealthy state may be given a visualization indication of a danger or warning symbol.

Figure 2:
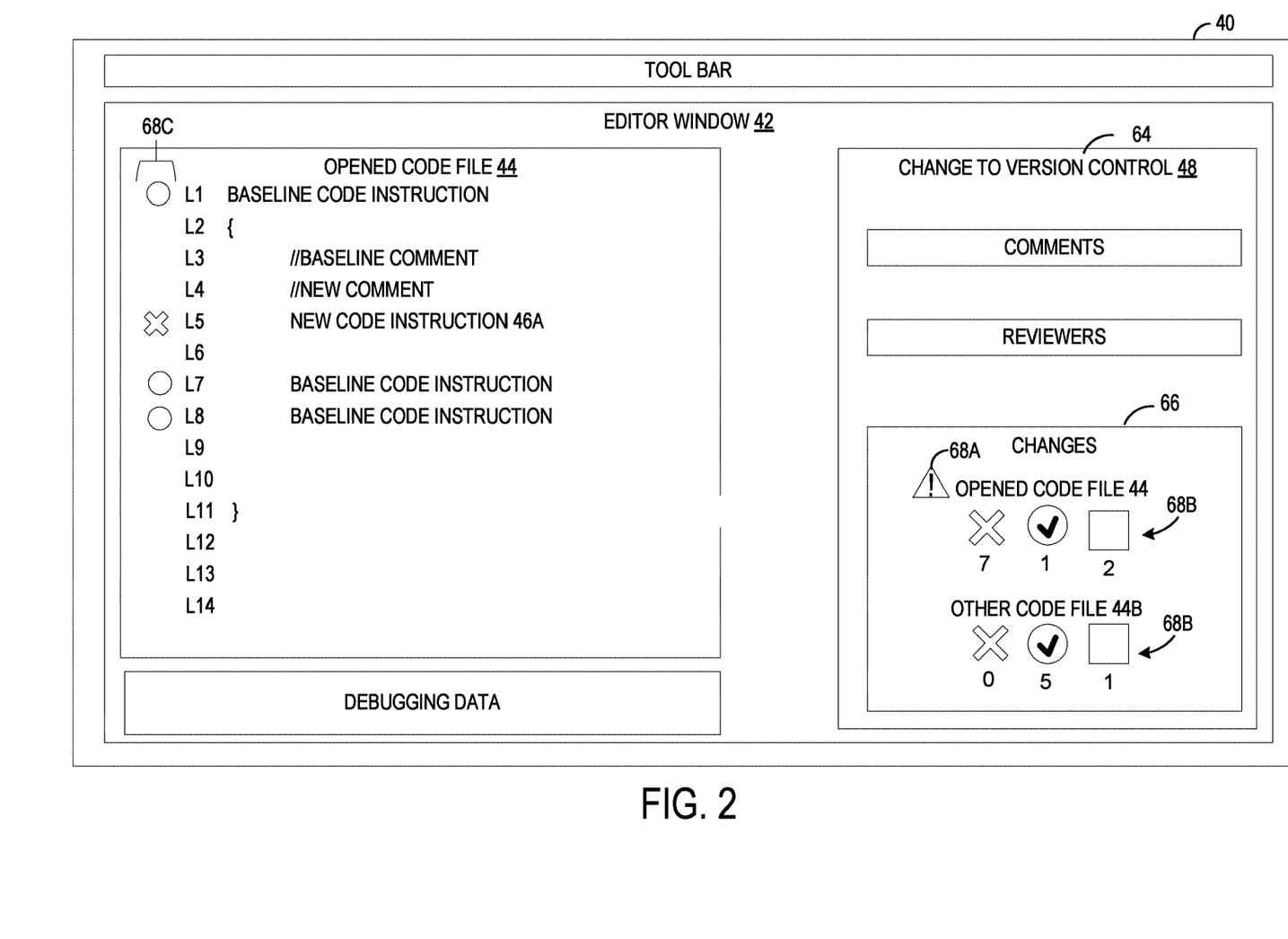
FIG. 2 shows an example graphical user interface for the integrated development environment implemented by the computer device of FIG. 1.

FIG. 2 illustrates an example GUI 40 of the IDE 24. The illustrated GUI 40 may include various GUI components such as, for example, a tool bar, a debugger window, etc. The GUI 40 also includes the editor window 42 of the IDE 24 that is currently showing the opened code file 44. The code instructions and comments of the opened code file 44 are organized by line number and presented within the editor window 30. In this example, the user is preparing to make the change to version control 48 via a version control GUI element 64, which, for example, provides an interface for the user to enter comments, select one or more commits for a change to version control 48 of a pull request, select reviewers, etc. The version control GUI element 64 may include a list of changed code files 66 that have been changed/edited in the current change to version control 48. In the illustrated example, the opened code file 44 and another code file 44B have been changed in the illustrated change to version control 48.

Before the change to version control 48 is submitted, the IDE 24 executed by the processor 18 is configured to retrieve the technical debt data 54 from the unit testing system 34 and display the visualization of the technical debt data 56 via the GUI 40. In the illustrated example, the visualization of the technical debt data 56 includes a plurality of visualization components 68 configured to present the technical debt data 54, such as, for example, the test result data 50, the code coverage data 58, the total number of unit tests 60, and the unit test health data 62.

In the illustrated example, the plurality of visualization components 68 include a unit test health visualization component 68A that indicates a health state of the unit tests covering that code file. In this example, the unit test health visualization component 68A shows a warning sign that alerts the user that the unit tests associated with the opened code file 44 are in an unhealthy state.

The plurality of visualization components 68 further includes a test result visualization component 68B that indicates the test result data 50 for each of the unit tests associated with the code file. In the illustrated example, the test result visualization component 68B includes an "X" symbol that indicates failed unit tests, a check marked circle symbol that indicates successful unit tests, and a square symbol that indicates unrun unit tests.

The test result visualization component 68B may also include data for the total number of unit tests 60, and may further indicate the total number of unit tests associated with the code file that have passed, failed, or were not run at the time that the user prepared to make the change to version control 48. In the illustrated example, for the opened code file 44, seven unit tests have failed, one has succeeded, and two were not run. Thus, the health state of the unit tests associated with the opened code file 44 may be determined to be unhealthy, and the unit test health visualization component 68A presents the warning sign to indicate the unhealthy state.

The plurality of visualization components 68 further includes a code coverage visualization component 68C that indicates the code coverage data 58 for each code instruction 34 of the opened code file 44. In the illustrated example, the code coverage visualization component 68C includes an "X" symbol next to line L5 of the opened code file 44 indicating that the new code instruction 46A at line L5 is not currently covered by a unit test of the plurality of unit tests 36. On the other hand, the code coverage visualization component 68C includes a circle symbol next to lines L1, L7, and L8 indicating that the old baseline code instructions are still covered by the plurality of unit tests 36. In one example, the code coverage visualization component 68C may further include visualizations for a degree of coverage for each code instruction, such as, for example, a red highlight for low to no coverage, a yellow highlight for medium coverage, and a green highlight for high coverage.

It will be appreciated that the example visualization of the technical debt 56 and the plurality of visualization components 68 discussed above are merely illustrative. The visualization of technical debt 56 may take other forms, and may utilize other visualization techniques to present the technical debt data 54 for the change to version control 48.

Turning back to FIG. 1, based on detecting that the user is preparing to make the change to version control 48, the processor 18 may be configured to output the editor window 42 of the integrated development environment 24 in a difference view mode 70. For example, the processor 18 may be configured to open one of the changed code files of the change to version control 48 in a new tab of the editor window 42 operating in the difference view mode 70.

The difference view mode 70 causes the editor window 42 to emphasize a code difference 72 between a changed code file from the change to version control 48 and a baseline code file, using an emphasis technique such as highlighting, a change in font, bolding, underlining, strikethrough, italicization, or change in color, as described below. The changed code file may be opened as the opened code file 44. Additionally, the change to version control 48 includes an implied baseline for each of the changed code files. That is, the change to version control 48, such as, for example, a commit or pull request, includes one or more changes/edits that will be applied to the previous version 32 of the set of code files 28 to become the new version of the set of code files 28 from the change to version control 48. Thus, the processor 18 may be configured to automatically select the previous version of the changed code file 74 from the local repository 30 of the version control system 26 as a baseline code file 76.

The editor window 42 operating in the difference view mode 70 may be configured to display both the baseline code file 76 and the opened code file 44, and emphasize a code difference 72 between those code files. In this example, the processor 18 may be configured to output the visualization of technical debt data 56 in the editor window 42 operating in the difference view mode 70.

Figure 3:
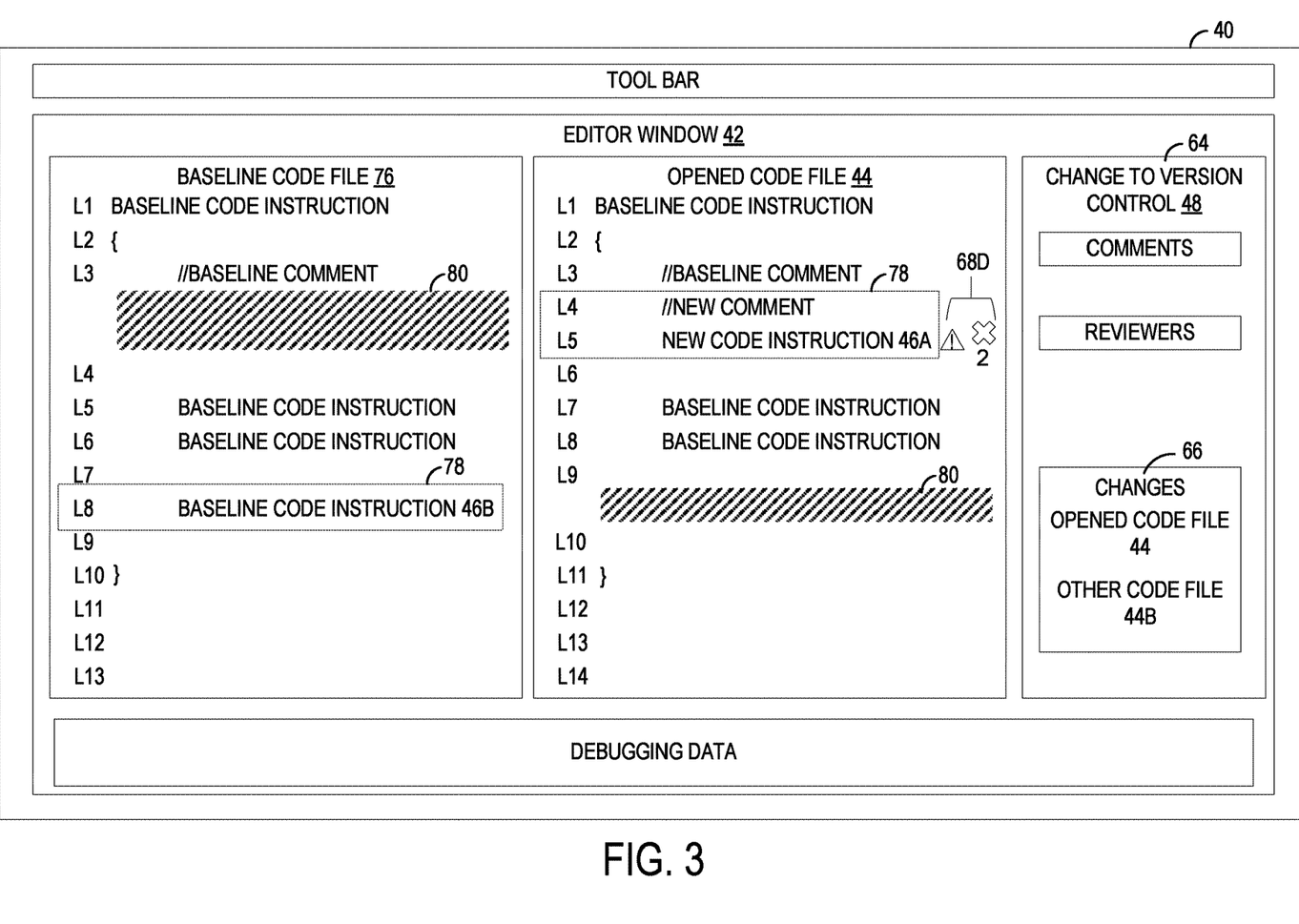
FIG. 3 shows an example editor window of the graphical user interface operating in a difference view mode implemented by the computer device of FIG. 1.

FIG. 3 illustrates an example GUI 40 of the IDE 24. The illustrated GUI 40 includes the editor window 42 of the IDE 24 that is currently operating in the difference view mode 70. Thus, as shown, the editor window 42 visually presents the opened code file 44 and the baseline code file 76. In the illustrated example, the code instructions and comments of the opened code file 44 and the baseline code file 76 are organized by line number and presented side-by-side in the editor window 42. In this specific example, the code instructions at lines L1 and L2 of the baseline code file 76 remain unchanged in the opened code file 32.

However, at line L4 of the opened code file 44, the user has inserted a new comment that is not included in the baseline code file 76. Similarly, at line L5 of the opened code file 44, the user has inserted a new code instruction 46A that is also not included in the baseline code file 76. The processor 18 detects these differences 72 of the new code instruction 46A and the new comment, and emphasizes the detected differences 72 in the editor window 42.

In one example, to emphasize the detected differences 72 in the editor window 42, the processor 18 may be configured to highlight the lines in the editor window 42 that include code differences and/or non-instruction differences. In the example illustrated in FIG. 3, a highlight 78 has been applied to lines L4 and L5 for the opened code file 44 to emphasize the new comment and the new code instructions 46A to the user. A contrasting highlight 80 may also applied to a corresponding space of the editor window 42 for the baseline code file 76.

Continuing the illustrated example, lines L5, L6, and L8 of the baseline code file 76 include baseline code instructions. The baseline code instructions of lines L5 and L6 of the baseline code file 76 remain unchanged at lines L7 and L8 of the opened code file 44. However, the baseline code instructions of line L8 of the baseline code file 76 have been deleted from the opened code file 44. The processor 18 may detect this difference 72 of the deleted baseline code instruction 46B, and emphasizes the detected difference in the editor window 42. In the example illustrated in FIG. 3, a highlight 78 has been applied to line L8 for the baseline code file 76, and a contrasting highlight 80 has been applied to a corresponding space of the editor window 42 for the opened code file 44.

In one example, the highlight 78 and contrasting highlight 80 take the form of changes in background color or shading of the lines of the editor window 42. As another example, the highlight 78 may be a change in color of the code instructions or comments that have been changed. It will be appreciated that other forms and styles of emphasis may be used by the processor 18 to emphasize the differences 72 between the baseline code file 76 and the opened code file 44. For example, a change in font, bolding, underlining, strikethrough, italicization, color etc., may be used to emphasize the differences 72 in the editor window 42.

As illustrated in FIG. 3, the processor 18 may be configured to output the visualization of technical debt data 56 in the editor window 42 operating in the difference view mode 70. In one example, the visualization of technical debt data 56 includes, for each of a plurality of code differences 72, an indication of associated technical debt data 54 for that code difference 72. As discussed above, the user has added the new code instruction 46A at line L5 of the opened code file 44, which is a changed code file of the change to version control 48 currently being prepared by the user. In this example, the visualization of technical debt data 56 includes a difference view visualization component 68D that indicates the associated technical debt data 54 for the new code instruction 46A. In this specific example, the difference view visualization component 68D includes a warning symbol to indicate that a health state of the unit tests from the test health data 62 for the new code instruction 46A is unhealthy. The difference view visualization component 68D also includes an "X" symbol and a number "2" to indicate that two unit tests cover the new code instruction 46A, but that they both failed. Difference view visualization components 68D may be generated for each new code instruction or difference 72 to indicate the associated technical debt data 54 for that code difference 72.

It will be appreciated that the example visualization of the technical debt 56 and the difference view visualization component 68D discussed above are merely illustrative. The visualization of technical debt 56 may take other forms, and may utilize other visualization techniques to present the technical debt data 54 for the change to version control 48 in the editor window 42 operating in the difference view mode 70.

Figure 4:
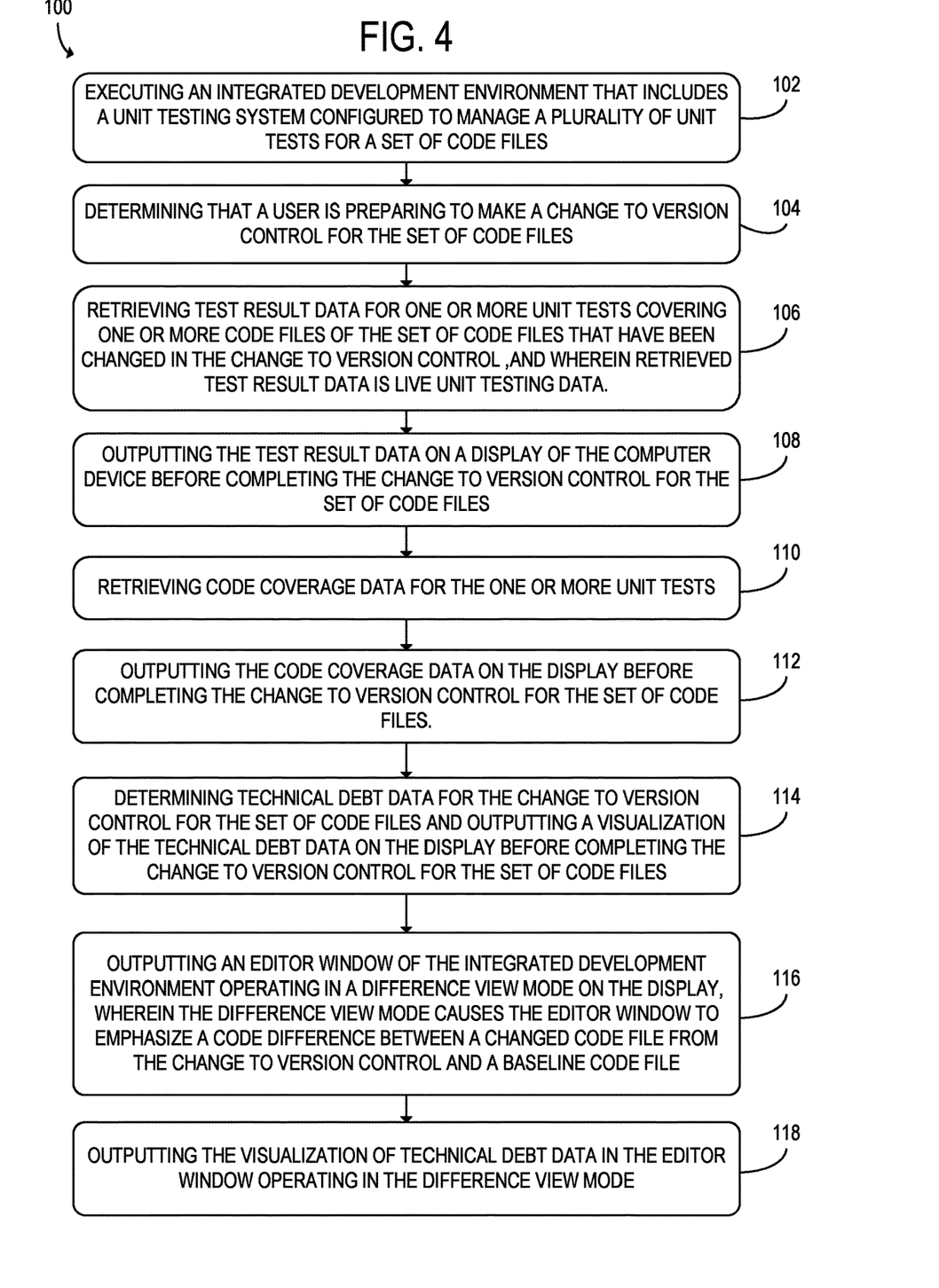
FIG. 4 shows a computer-implemented method for outputting test result data before completing a change to version control implemented by the computer device of FIG. 1.

FIG. 4 shows a flowchart of a computer-implemented method 100. The method 100 may be implemented by the computer device 10 of FIG. 1. At 102, the method 100 may include executing an integrated development environment that includes a unit testing system configured to manage a plurality of unit tests for a set of code files. Each of the plurality of unit tests 36 is configured to perform one or more tests on a unit of source code of an associated code file of the set of code files 28. In one example, the unit testing system is configured for performing live unit testing as the set of code files are edited in real-time. In the example illustrated in FIG. 1, as the user edits and changes a particular code file, such as adding a new line of code, data for the edited code file may be sent to the live unit testing module 37 which may be configured to perform one or more of the plurality of unit tests 36 that are associated with the edited code file. These unit tests may be iteratively performed when the user makes edits to the code file, and the results of those iterative tests may be output to the test window 38.

At 104, the method 100 may include determining that a user is preparing to make a change to version control for the set of code files. In a git-based version control example, the change to version control may include a commit or a pull request that includes one or more commits. The processor 18 may determine that the user is preparing to make the change to version control 48 when the user opens the pull request tool and selects one or more commits. However, it will be appreciated that the method 100 may also be applied to other types of version control systems.

At 106, the method 100 may include retrieving test result data for one or more unit tests covering one or more code files of the set of code files that have been changed in the change to version control. In the example illustrated in FIG. 1, the test result data 50 is retrieved from the unit testing system 34. In particular, the unit testing system 34 may be configured to store test result data 50 that is generated after running the plurality of unit tests 36 on the set of code files 28. In one example, the plurality of unit tests 36 may be manually selected by the user via the test window 38 to be run. In another example, the plurality of unit tests 36 may be automatically run in the background by the live unit testing module 37, and the retrieved test result data may take the form of live unit testing data.

At 108, the method 100 may include outputting the test result data on a display of the computer device before completing the change to version control for the set of code files. That is, before the change to version control 48 is submitted and applied to the set of code files 28, the test result data 50 is presented to the user so that the user may review the results of the plurality of unit tests 36 associated with the changed code files in the change to version control 48 currently being prepared by the user.

At 110, the method 100 may include retrieving code coverage data for the one or more unit tests. The code coverage data 58 may be generated by the live unit testing module 37 as discussed above with reference to FIG. 1.

At 112, the method 100 may include outputting the code coverage data on the display before completing the change to version control for the set of code files. Similarly to step 108, the code coverage data may be presented to the user before the change to version control, such as a pull request, is submitted and applied to the set of code files.

In some examples, the test result data and the code coverage data are utilized for determining technical debt data. In these example, at 114, the method 100 may include determining technical debt data for the change to version control for the set of code files and outputting a visualization of the technical debt data on the display before completing the change to version control for the set of code files. In one example, the technical debt data includes a total number of unit tests of the plurality of unit tests that cover the one or more code files of the set of code files that have been changed in the change to version control. The total number of unit tests may be determined at least in part based on the test result data retrieve at step 106. In another example, the technical debt data includes code coverage data for the plurality of unit tests that cover the one or more code files of the set of code files that have been changed in the change to version control. The code coverage data for the technical debt data may be retrieved at step 110. In yet another example, the technical debt data includes unit testing health data for the plurality of unit tests that cover the one or more code files of the set of code files that have been changed in the change to version control, the unit testing health data summarizing a state of the test result data for each of the one or more code files. The unit testing health data may be determined at least in part based on both the unit test data and the code coverage data. Too few unit tests for the complexity of a code instruction, too many failing test, or insufficient code coverage may cause the unit testing health data to indicate an unhealthy state for that code instruction.

The technical debt data may be visualized and presented to the user before the change to version control 48 is submitted and applied to the set of code files 28 so that the user may review the technical debt that potentially may be added to the set of code files 28 from the change to version control 48 currently being prepared by the user. By highlighting the technical debt being added by a given change to version control before that change is applied, the user can understand how much technical debt might be added and address the technical debt before it is applied to the set of code files 28.

In one example, the IDE may be configured to open the changed files in the change to version control in a difference view mode to highlight the changes/edits in that code file. In this example, at 116, the method 100 may include outputting an editor window of the integrated development environment operating in a difference view mode on the display. The difference view mode causes the editor window to emphasize a code difference between a changed code file from the change to version control and a baseline code file. FIG. 3 illustrates an example editor window operating in the difference view mode. As described above with reference to FIG. 3, highlights may be applied to code instructions that have been changed, added, deleted, or otherwise edited to emphasize a code difference between the opened code file and the baseline code file.

At 118, the method 100 may include outputting the visualization of technical debt data in the editor window operating in the difference view mode. In one example, the visualization of technical debt data includes, for each of a plurality of code differences, an indication of associated technical debt data for that code difference. As discussed above regarding FIG. 2 and FIG. 3, the visualization of technical debt data may include various visualization components configured to convey the states of the test result data 50, the code coverage data 58, the number of unit tests 60, and the test health data 62 to the user. When the editor is operating in the difference view mode, the visualization components may present the relevant technical debt data for each code difference.

According to the method 100 described above, the user may be presented with the technical debt data associated with the code changes included in the user's pending change to version control. By viewing the potential added technical debt before submitting the change to version control, the user may be motivated to perform additional unit testing to reduce the amount of technical debt their changes will add the set of code files.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
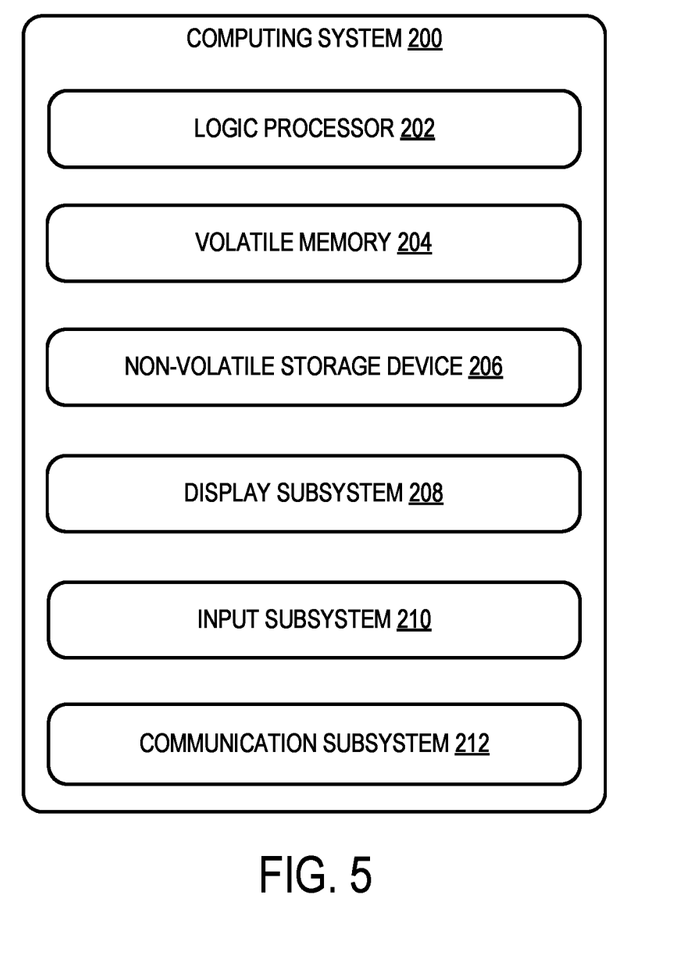
FIG. 5 shows a schematic representation of an example computing system, according to one embodiment of the present disclosure.

FIG. 5 schematically shows a non-limiting embodiment of a computing system 200 that can enact one or more of the methods and processes described above. Computing system 200 is shown in simplified form. Computing system 200 may, for example, embody the computer device 10 of FIG. 5, or may instead embody some other computing system. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 200 includes a logic processor 202, volatile memory 204, and a non-volatile storage device 206. Computing system 200 may optionally include a display subsystem 208, input subsystem 210, communication subsystem 212, and/or other components not shown in FIG. 5.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 202 may include one or more physical processors (hardware) configured to execute software instructions. Additionally or alternatively, the logic processor 202 may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor 202 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 200 implemented to perform a particular function. In some cases, a program may be instantiated via logic processor 202 executing instructions held by non-volatile storage device 206, using portions of volatile memory 204. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 208 may be used to present a visual representation of data held by non-volatile storage device 206. As the herein described methods and processes change the data held by the non-volatile storage device 206, and thus transform the state of the non-volatile storage device 206, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem 210 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 212 may be configured to communicatively couple computing system 200 with one or more other computing devices. Communication subsystem 212 may include wired and/or wireless communication devices compatible with one or more different communication protocols. As non-limiting examples, the communication subsystem 212 may be configured for communication via a wireless telephone network, or a wired or wireless local- or wide-area network. In some embodiments, the communication subsystem 212 may allow computing system 200 to send and/or receive messages to and/or from other devices via a network such as the Internet.

The following paragraphs provide additional support for the claims of the subject application. One aspect provides a computer device comprising a display and a processor configured to execute an integrated development environment that includes a unit testing system configured to manage a plurality of unit tests for a set of code files. The processor is further configured to determine that a user is preparing to make a change to version control for the set of code files, retrieve test result data for one or more unit tests covering one or more code files of the set of code files that have been changed in the change to version control, and output the test result data on the display before completing the change to version control for the set of code files. In this aspect, additionally or alternatively, the unit testing system may be configured to perform live unit testing as the set of code files are edited in real-time, and wherein retrieved test result data may be live unit testing data. In this aspect, additionally or alternatively, the processor may be configured to retrieve code coverage data for the one or more unit tests, and output the code coverage data on the display before completing the change to version control for the set of code files. In this aspect, additionally or alternatively, the processor may be configured to determine technical debt data for the change to version control for the set of code files, and output a visualization of the technical debt data on the display before completing the change to version control for the set of code files. In this aspect, additionally or alternatively, the technical debt data may include a total number of unit tests of the plurality of unit tests that cover the one or more code files of the set of code files that have been changed in the change to version control. In this aspect, additionally or alternatively, the technical debt data may include code coverage data for the plurality of unit tests that cover the one or more code files of the set of code files that have been changed in the change to version control. In this aspect, additionally or alternatively, the technical debt data may include unit testing health data for the plurality of unit tests that cover the one or more code files of the set of code files that have been changed in the change to version control, the unit testing health data summarizing a state of the test result data for each of the one or more code files. In this aspect, additionally or alternatively, the processor may be further configured to output an editor window of the integrated development environment operating in a difference view mode on the display, wherein the difference view mode causes the editor window to emphasize a code difference between a changed code file from the change to version control and a baseline code file, and output the visualization of technical debt data in the editor window operating in the difference view mode. In this aspect, additionally or alternatively, the visualization of technical debt data may include, for each of a plurality of code differences, an indication of associated technical debt data for that code difference. In this aspect, additionally or alternatively, the change to version control may be a pull request.

Another aspect provides a method comprising, at a computer device including a processor, executing an integrated development environment that includes a unit testing system configured to manage a plurality of unit tests for a set of code files. The method further comprises determining that a user is preparing to make a change to version control for the set of code files, retrieving test result data for one or more unit tests covering one or more code files of the set of code files that have been changed in the change to version control, and outputting the test result data on a display of the computer device before completing the change to version control for the set of code files. In this aspect, additionally or alternatively, the unit testing system may be configured for performing live unit testing as the set of code files are edited in real-time, and wherein retrieved test result data is live unit testing data. In this aspect, additionally or alternatively, the method may further comprise retrieving code coverage data for the one or more unit tests, and outputting the code coverage data on the display before completing the change to version control for the set of code files. In this aspect, additionally or alternatively, the method may further comprises determining technical debt data for the change to version control for the set of code files, and outputting a visualization of the technical debt data on the display before completing the change to version control for the set of code files. In this aspect, additionally or alternatively, the technical debt data may include a total number of unit tests of the plurality of unit tests that cover the one or more code files of the set of code files that have been changed in the change to version control. In this aspect, additionally or alternatively, the technical debt data may include code coverage data for the plurality of unit tests that cover the one or more code files of the set of code files that have been changed in the change to version control. In this aspect, additionally or alternatively, the technical debt data may include unit testing health data for the plurality of unit tests that cover the one or more code files of the set of code files that have been changed in the change to version control, the unit testing health data summarizing a state of the test result data for each of the one or more code files. In this aspect, additionally or alternatively, the method may further comprises outputting an editor window of the integrated development environment operating in a difference view mode on the display, wherein the difference view mode causes the editor window to emphasize a code difference between a changed code file from the change to version control and a baseline code file, and outputting the visualization of technical debt data in the editor window operating in the difference view mode. In this aspect, additionally or alternatively, the visualization of technical debt data may include, for each of a plurality of code differences, an indication of associated technical debt data for that code difference.

Another aspect provides a computer device comprising a display, and a processor configured to execute an integrated development environment that includes a unit testing system configured to manage a plurality of unit tests for a set of code files. The processor is further configured to determine that a user is preparing to make a change to version control for the set of code files, determine technical debt data for one or more unit tests covering one or more code files of the set of code files that have been changed in the change to version control, and output a visualization of the technical debt data on the display before completing the change to version control for the set of code files.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer device comprising:
a display; and
a processor configured to:
execute an integrated development environment that includes a unit testing system configured to manage a plurality of unit tests for a set of code files, wherein the unit testing system is configured to perform live unit testing as the set of code files are edited in real-time;
determine that a user has opened a commit or pull request tool of the integrated development environment to make a request to initiate a change to version control for the set of code files;
in response to a selection of one or more changed code files for the change to version control using the commit or pull request tool and before submission of the selected one or more changed code files using the commit or pull request tool to a remote version control system over a communications network:
retrieve test result data for one or more of the plurality of unit tests performed by the integrated development environment, wherein the test result data was generated by the unit testing system performing live unit testing prior to the selection of one or more changed code files using the commit or pull request tool, the one or more unit tests covering one or more code files of the set of code files that have been changed in the change to version control,
output the test result data on the display via a graphical user interface of the integrated development environment, and
after presenting the retrieved test result data, submit the request to initiate the change to version control to the remote version control system over the communications network.

2. The computer device of claim 1, wherein the processor is configured to:
retrieve code coverage data for the one or more unit tests; and
output the code coverage data on the display before submitting the selected one or more changed code files using the commit or pull request tool to the remote version control system.

3. The computer device of claim 1, wherein the processor is configured to:
determine technical debt data for the change to version control for the set of code files; and
output a visualization of the technical debt data on the display before submitting the selected one or more changed code files using the commit or pull request tool to the remote version control system.

4. The computer device of claim 3, wherein the technical debt data includes a total number of unit tests of the plurality of unit tests that cover the one or more code files of the set of code files that have been changed in the change to version control.

5. The computer device of claim 3, wherein the technical debt data includes code coverage data for the plurality of unit tests that cover the one or more code files of the set of code files that have been changed in the change to version control.

6. The computer device of claim 3, wherein the technical debt data includes unit testing health data for the plurality of unit tests that cover the one or more code files of the set of code files that have been changed in the change to version control, the unit testing health data summarizing a state of the test result data for each of the one or more code files.

7. The computer device of claim 3, wherein the processor is further configured to:
output an editor window of the integrated development environment operating in a difference view mode on the display, wherein the difference view mode causes the editor window to emphasize a code difference between a changed code file from the change to version control and a baseline code file; and
output the visualization of technical debt data in the editor window operating in the difference view mode.

8. The computer device of claim 7, wherein the visualization of technical debt data includes, for each of a plurality of code differences, an indication of associated technical debt data for that code difference.

9. The computer device of claim 1, wherein the change to version control is a pull request.

10. A method comprising:
at a computer device including a processor:
executing an integrated development environment that includes a unit testing system configured to manage a plurality of unit tests for a set of code files, wherein the unit testing system is configured to perform live unit testing as the set of code files are edited in real-time;
determining that a user has opened a commit or pull request tool of the integrated development environment to make a request to initiate a change to version control for the set of code files;
in response to a selection of one or more changed code files for the change to version control using the commit or pull request tool and before submission of the selected one or more changed code files using the commit or pull request tool to a remote version control system over a communications network:
retrieving test result data for one or more of the plurality of unit tests performed by the integrated development environment, wherein the test result data was generated by the unit testing system performing live unit testing prior to the selection of one or more changed code files using the commit or pull request tool, the one or more unit tests covering one or more code files of the set of code files that have been changed in the change to version control,
outputting the test result data on a display via a graphical user interface of the integrated development environment of the computer device, and
after presenting the retrieved test result data, submitting the request to initiate the change to remote version control to the version control system over the communications network.

11. The method of claim 10, further comprising:
retrieving code coverage data for the one or more unit tests; and outputting the code coverage data on the display before submitting the selected one or more changed code files using the commit or pull request tool to the remote version control system.

12. The method of claim 10, further comprising:
determining technical debt data for the change to version control for the set of code files; and
outputting a visualization of the technical debt data on the display before submitting the selected one or more changed code files using the commit or pull request tool to the remote version control system.

13. The method of claim 12, wherein the technical debt data includes a total number of unit tests of the plurality of unit tests that cover the one or more code files of the set of code files that have been changed in the change to version control.

14. The method of claim 12, wherein the technical debt data includes code coverage data for the plurality of unit tests that cover the one or more code files of the set of code files that have been changed in the change to version control.

15. The method of claim 12, wherein the technical debt data includes unit testing health data for the plurality of unit tests that cover the one or more code files of the set of code files that have been changed in the change to version control, the unit testing health data summarizing a state of the test result data for each of the one or more code files.

16. The method of claim 12, further comprising:
outputting an editor window of the integrated development environment operating in a difference view mode on the display, wherein the difference view mode causes the editor window to emphasize a code difference between a changed code file from the change to version control and a baseline code file; and
outputting the visualization of technical debt data in the editor window operating in the difference view mode.

17. The method of claim 16, wherein the visualization of technical debt data includes, for each of a plurality of code differences, an indication of associated technical debt data for that code difference.

18. A computer device comprising:
a display; and
a processor configured to:
execute an integrated development environment that includes a unit testing system configured to manage a plurality of unit tests for a set of code files, wherein the unit testing system is configured to perform live unit testing as the set of code files are edited in real-time;
determine that a user has opened a commit or pull request tool of the integrated development environment to make a request to initiate a change to version control for the set of code files;
in response to a selection of one or more changed code files for the change to version control using the commit or pull request tool and before submission of the selected one or more changed code files using the commit or pull request tool to a remote version control system over a communications network:
determine technical debt data for one or more unit of the plurality of tests performed by the integrated development environment, wherein the technical debt data was generated by the unit testing system performing live unit testing prior to the selection of one or more changed code files using the commit or pull request tool, the one or more unit tests covering one or more code files of the set of code files that have been changed in the change to version control,
output a visualization of the technical debt data on the display via a graphical user interface of the integrated development environment, and
after presenting the retrieved the technical debt data, submit the request to initiate the change to version control to the remote version control system over the communications network.

* * * * *